(12) United States Patent
Krozer et al.

(10) Patent No.: US 7,406,876 B2
(45) Date of Patent: Aug. 5, 2008

(54) SENSOR ARRANGEMENT

(75) Inventors: Anatol Krozer, Göteborg (SE); Christer Johansson, Göteborg (SE); Sofia Johnsson, Göteborg (SE); Brodde Wetter, Göteborg (SE); Henrik Danielsson, Malmö (SE); Gustav Perers, Göteborg (SE)

(73) Assignee: Vasensor AB, Göteborg (SE)

( * ) Notice: Subject to any disclaimer, the term of this patent is extended or adjusted under 35 U.S.C. 154(b) by 163 days.

(21) Appl. No.: 10/542,057

(22) PCT Filed: Jan. 19, 2004

(86) PCT No.: PCT/SE2004/000062

§ 371 (c)(1),
(2), (4) Date: Apr. 6, 2006

(87) PCT Pub. No.: WO2004/065145

PCT Pub. Date: Aug. 5, 2004

(65) Prior Publication Data

US 2006/0207319 A1    Sep. 21, 2006

Related U.S. Application Data

(60) Provisional application No. 60/319,874, filed on Jan. 17, 2003.

(30) Foreign Application Priority Data

Jan. 17, 2003  (SE) .................................... 0300127

(51) Int. Cl.
*G01M 17/02* (2006.01)

(52) U.S. Cl. .......................... 73/777; 73/146; 73/146.5; 73/159; 73/862.55

(58) Field of Classification Search .................. 73/777
See application file for complete search history.

(56) References Cited

U.S. PATENT DOCUMENTS 4,862,486 A     8/1989  Wing et al.

(Continued)

FOREIGN PATENT DOCUMENTS

DE           37 41 700 A1    6/1989

(Continued)

OTHER PUBLICATIONS

PCT International Preliminary Report on Patentability dated Jul. 22, 2005, for International Application No. PCT/SE2004/000062.

(Continued)

*Primary Examiner*—Edward Lefkowitz
*Assistant Examiner*—Freddie Kirkland, III
(74) *Attorney, Agent, or Firm*—Harness, Dickey & Pierce, P.L.C.

(57) ABSTRACT

The present invention relates to a system for detecting characteristics of an elastic structure (13, 22, 23, 32, 33, 93, 1202, 1302, 1402), said structure being provided with at least one sensor (111, 112, 14, 211, 212, 311, 312, 911, 1211, 1311, 1411) and said system comprising at least one detector (16, 416, 516, 916, 1316, 1416). The sensor comprises a deformable member, which upon deformation generates a signal convertible to a signal representing said characteristic, said sensor further comprises a passive transmitter and said detector a receiver for receiving said signal representing said characteristic.

49 Claims, 8 Drawing Sheets

U.S. PATENT DOCUMENTS

| | | | | |
|---|---|---|---|---|
| 4,898,012 | A | 2/1990 | Jones et al. | |
| 5,218,861 | A * | 6/1993 | Brown et al. | 73/146.5 |
| 5,383,371 | A | 1/1995 | Laitinen | |
| 5,546,070 | A | 8/1996 | Ellmann et al. | |
| 5,559,437 | A | 9/1996 | Baccaud et al. | |
| 5,562,027 | A | 10/1996 | Moore | |
| 5,565,219 | A * | 10/1996 | Hatanaka et al. | 425/145 |
| 5,592,875 | A | 1/1997 | Moschel | |
| 5,607,703 | A * | 3/1997 | Sakai et al. | 425/145 |
| 5,699,729 | A | 12/1997 | Moschel | |
| 5,821,433 | A | 10/1998 | Goldman et al. | |
| 5,908,537 | A * | 6/1999 | Bentele et al. | 162/360.3 |
| 5,953,230 | A | 9/1999 | Moore | |
| 6,005,388 | A | 12/1999 | Kaefer-Hoffmann et al. | |
| 6,105,423 | A | 8/2000 | Prottey | |
| 6,246,226 | B1 | 6/2001 | Kawase et al. | |
| 6,370,961 | B1 | 4/2002 | Trantzas et al. | |
| 6,463,798 | B2 * | 10/2002 | Niekerk et al. | 73/146.2 |
| 6,903,704 | B2 * | 6/2005 | Forster et al. | 343/806 |
| 6,910,376 | B2 * | 6/2005 | Maenpaa | 73/159 |
| 7,132,930 | B2 * | 11/2006 | Wilson et al. | 340/426.33 |
| 7,185,537 | B2 * | 3/2007 | Muhs | 73/159 |
| 7,239,287 | B2 * | 7/2007 | Forster | 343/795 |
| 2003/0144119 | A1 | 7/2003 | Kleiser et al. | |
| 2004/0079147 | A1 | 4/2004 | Mäenpää | |

FOREIGN PATENT DOCUMENTS

| | | |
|---|---|---|
| DE | 197 45 734 A1 | 4/1999 |
| DE | 199 20 133 A1 | 11/2000 |
| EP | 0 538 221 A2 | 4/1993 |
| EP | 0 887 211 A1 | 12/1998 |
| EP | 1 136 804 | 9/2001 |
| EP | 1 237 054 A1 | 9/2002 |
| FI | 973344 | 8/1997 |
| FR | 2580997 | 10/1986 |
| FR | 2592954 | 7/1987 |
| FR | 2645799 | 10/1990 |
| JP | 56138009 | 10/1981 |
| JP | 4254730 | 10/1992 |
| WO | WO 00/02741 | 1/2000 |
| WO | WO 00/58704 | 10/2000 |
| WO | WO 01/68388 A1 | 9/2001 |
| WO | WO 02/066239 | 8/2002 |
| WO | WO 02/086435 | 10/2002 |
| WO | WO 02/099188 A1 | 12/2002 |
| WO | WO 03/027623 A1 | 3/2003 |

OTHER PUBLICATIONS

PCT Written Opinion of the International Searching Authority dated Apr. 23, 2004, for International Application No. PCT/SE2004/000062.

English Translation of Office Action dated May 18, 2007 for corresponding Chinese Application No. 200480002259.4.

* cited by examiner

SENSOR ARRANGEMENT

PRIORITY STATEMENT

This application is a PCT National Stage of Application of PCT/SE2004/000062 filed Jan. 19, 2004, which claims priority under on Swedish Patent Application No. SE 0300127-8 filed in Sweden on Jan. 17, 2003, and U.S. patent application No. 60/319,874 filed in United States on Jan. 17, 2003, the entire contents of each of which is hereby incorporated herein by reference.

TECHNICAL AREA

The present invention relates to a system and method for detecting characteristics of an elastic structure, which is provided with at least one sensor and the system comprises at least one detector

DESCRIPTION OF STATE OF THE ART

Cylinder shaped bodies, e.g. tyres and other structures, which are manufactured of rubber, synthetic or organic material or the like, are deformed because of the contact with another surface. Moreover, the characteristics and functions of different structures are deteriorated in course of time.

Besides cylinder shaped bodies, the characteristics of a flat body, such as a sheet material, e.g. paper, paper board, fabric or conveyer, such as wire felt belt or paper machine clothing are of special interest.

Different methods and devices have suggested for detection of deformation, e.g.: WO 00/02741 discloses a method and an apparatus for counting the revolutions of a pneumatic tyre utilizing a sensor, which responds to the periodic mechanical stresses when the tyre rotates under load on a load-bearing surface such as a roadway. The sensor can be constituted of a piezo-element, electrically connected to a revolution counting module. The piezo-element is suitably attached to or embedded within the inner wall of the tyre, under the tread or the side wall, in a way which causes it to flex with the tyre each time the circumferential sector of the tyre containing the piezo-element is compressed against the road or another vehicle supporting surface.

U.S. Pat. No. 6,105,423 discloses a sensor comprising a piezo-electric bar for detecting rotations of a pneumatic tyre on a vehicle. The piezo-electric bar is effectively fixed at its two ends, which ends are also attached to two spaced apart points on the inner surface of the tyre tread by means of adhesive. The centre of the plezo electric bar is attached to the centre of the base, and then to the inner surface of the tyre, at a point midway between said end points of the bar. Thus, when the tyre tread is flattened in the contact patch from its normal curved shape, the centre of the bar is radially moved inwards with respect to the fixed point at its ends. An electrical circuit block processes the signal so that an output pulse is produced only for radially inward movement of the contact point.

U.S. Pat. No. 4,862,486 discloses an apparatus comprising a piezoelectric polymer sensor, which senses a change in stress when a given section of the tyre is stressed with each revolution. The piezoelectric polymers are comprised of aligned dipoles acting to apply and release stresses on the piezoelectric polymer sensor when stressing the tyre. The apparatus is mounted to the inner sidewall of the tyre.

JP 04254730 A discloses a device for monitoring tyre air pressure, which allows the tyre pressure to be detected constantly while an ambient environment of the tyre is stable against fluctuation. The device comprises a piezo-electric element, of which the impedance changes according to an air pressure of a tyre, and a rim-side coil is changed by a fluctuation of an ambient environment of the tyre as well.

U.S. Pat. No. 5,546,070 discloses the use of a piezo ceramic element simultaneously as a sensor and also as an energy source for a capacitor to supply a transmission unit.

DE 197 45 734 A1 shows a sensor for detecting and registering the wear and the tread of a tyre. The tyre comprises single elements, however, which are not dispersed. In FR 2645799 a magnetic mass is arranged at a specified depth of the tyre, and consequently, can be supervised.

U.S. Pat. No. 5,559,437 relates to methods and apparatus for checking the condition of worn tyres, e.g. before recapping, for the non-destructive verification of the condition of a metallic reinforcement element of worn tyres. U.S. Pat. No. 6,005,388 relates to methods for detecting defects in tyres.

Common for prior art for detecting the characteristics of flat structures when passing one or several cylindrical bodies is arranging sensors in the cylindrical body itself, example of such a prior art includes: WO 02/066239, U.S. Pat. No. 5,562,027, US 2003/0144119, EP 0538 221, DE 199 20 133, WO 03/027623, U.S. Pat. No. 5,821,433 and U.S. Pat. No. 6,370,961.

To summarise, main difference between the present invention and prior art is that present invention uses capacitive and/or inductive transmission of signals from a sensor to a detector, which eliminates need for energizing elements for sensors and antennas.

SUMMARY OF THE INVENTION

It is an object of the present invention to provide an arrangement for determining the condition of a flat or substantially cylindrical body, being resilient (deformable), particularly a rotateble body or structure. The condition comprises mainly the deformation of the material.

Preferably, the substantially cylindrical resilient rotating body is a tyre, or a part thereof, and the arrangement is used for example, to determine the movement, e.g. revolution, which aids to determine velocity of a vehicle, the skid characteristics, the air pressure, etc.

Yet, another object of the present invention is to provide an arrangement for determining the condition of a substantially cylindrical rotating body in an apparatus and an associated structure, and the combination thereof as well. Preferably, in this case the cylindrical rotating body can be a roll or a cylinder for feeding a sheet material, such as paper. In this case, the arrangement is used for e.g. determining the movement and presence of the material, rotation speed, sliding characteristics.

Moreover, using sensors comprising a piezo-electric plastic or polymer material, according to one main aspect of the invention, gives certain advantages such as possibility for having larger detector elements. Moreover, the piezo-electric plastic material is less expensive than piezo-electric ceramic material. Furthermore, the piezo-electric plastic material can provide larger tensions and effects than the piezo-electric ceramic material as well. Yet, the two main advantages are the anisotropic characteristics of a piezo-elastic plastic material being utilized in the invention and the non-brittleness (plasticity).

According to one most preferred aspect of the invention, it is used as a detector for measuring the nip force, nip pressure and/or nip width of rolls in a nip roll press, for example for manufacturing a sheet material such as paper.

However, the invention can also be provided with additional types of sensors in form of a magnetic material being dispersed and disintegrated in the structure to be measured, or a magneto-elastic material in form of thin foils or the like.

BRIEF DESCRIPTION OF THE DRAWINGS

In the following the invention will be described with reference to the embodiments illustrated in enclosed drawings, in which.

DESCRIPTION OF PREFERRED EMBODIMENTS

To sum up the invention, all exemplary embodiments of the sensors described in the following, may be made of different materials, for example:

Piezoelectric material, which generate charge upon deformation. The charge can be transferred into a signal (voltage and/or current). The signal can be detected by external means (electric antennae) or it may drive a low power amplifier, which enhances the signal. This amplifier can be placed within the body itself. An external device can detect the amplified signal.

Magnetic material (permanently magnetic), e.g. a strip or magnetic particles.

Magneto-elastic material, which changes its magnetization upon deformation. When the deformed material returns to its non-deformed state the magnetization returns to its initial state. A magnetic antenna, for example suitable coils, can detect the magnetic material.

Figure 1A:
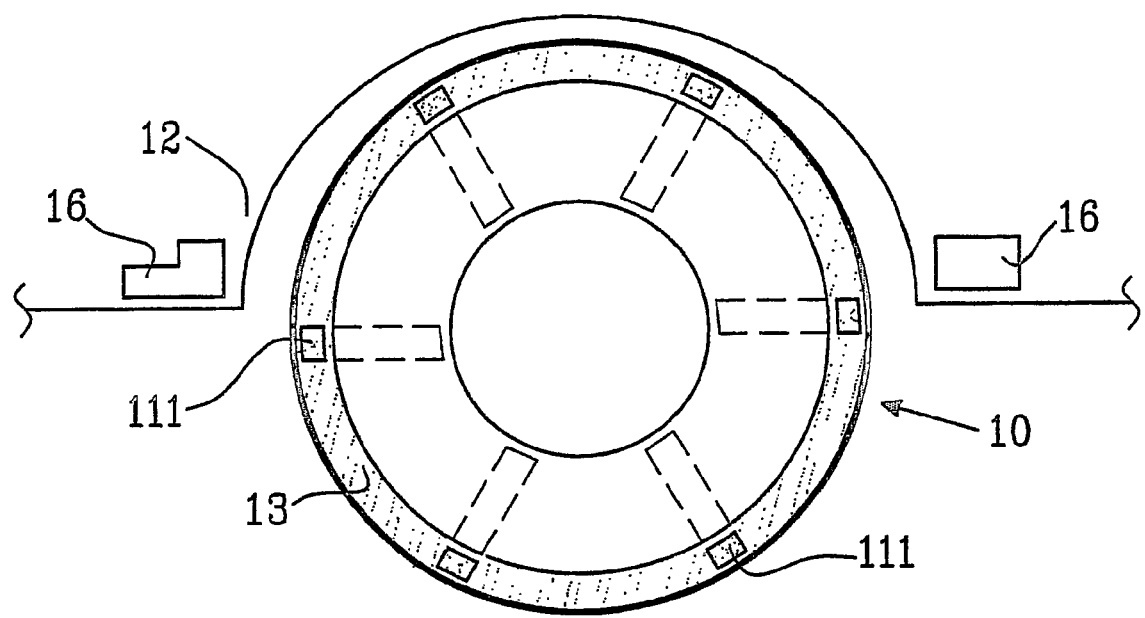
FIG. 1a is a schematic cross-sectional view of a first application employing a device according to the invention.
Figure 1B:
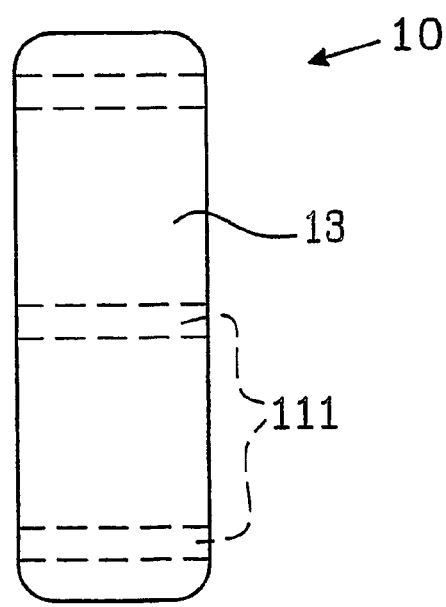
FIG. 1b is a schematic frontal view of the first application employing a device according to the invention.

In the first application, a substantially cylindrical rotating body 13 is schematically shown in FIGS. 1a and 1b. In this case, the body 13 comprises a wheel 10 of a vehicle 12, comprising the tyre 13. A number of sensors 111, for example six, are arranged on/in the tyre 13 or embodied into the tyre material. The tyre 13 is of a conventional type and made of an organic, resilient, elastic, rubberised material. The sensors 111 can preferably be arranged inside the metallic reinforcement or on the surface of the tyre 13.

In FIG. 1b, each sensor 111 is strip-shaped and arranged substantially in the axial direction of the tyre 13, but may also extend in the radial direction (FIG. 1a). However, in a second application according to FIG. 2, another type of sensor 112 is arranged in the longitudinal, peripheral direction of the tyre 13.

The sensors 111 and 112 consist of a piezo-electrical polymer material or of a magneto elastic material. During the rotation of the tyre, as a result of the contact between the tyre 13 and the ground, the tyre 13 is locally elongated, particularly in the contact zone between the tyre 13 and the ground. Thus, an elongation of the tyre 13 results in an elongation of the sensor element in close proximity of the part of the tyre that has contact with the ground and generation of a signal. After a short while, the element relaxes back to its original shape and signal is zeroed. Then the next strip is deformed and so on. Typically, the speed of about 100 km/h, and a wheel with radius of about 0.5 m (at the place of the strip) and provided with six strips gives a frequency of about 1 kHz.

The signals can be generated when both sides of the elongated sensor 111 are short-circuited by means of an appropriate resistance (not shown).

A magnetic detection is also possible, e.g. by creating a magnetic path formed as an appropriate coil on the tyre, which can be used for generating a pulsed magnetic field, which e.g. can be detected by an antenna arranged in connection with the vehicle body. The signal receiver is an important part of such an antenna, which can be arranged as another coil being charged when a magnetic field is generated by the coil in the tyre 13. Additionally, this arrangement can be arranged inside the metal reinforcement in the tyre 13 as well.

Another possibility is to use a magneto elastic material, which acts somewhat similar to the piezoelectric material. It changes its magnetization when deformed and returns to its initial magnetization when the deformation relaxes to equilibrium. Again, in this case an appropriate magnetic detection on the body of the vehicle may be used.

Figure 2:
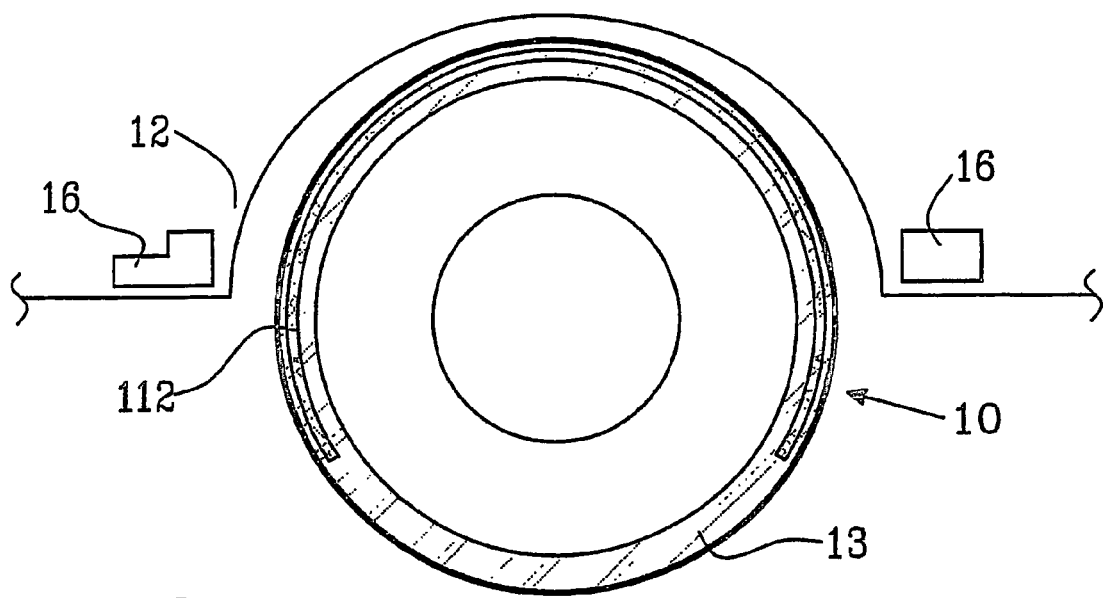
FIG. 2 is a cross-sectional view of a second application employing a device according to a second aspect of the invention.

However, on the contrary, the sensor 112 in the second embodiment as shown in FIG. 2, elongates during the time the part of the tyre that contains the sensor has contact with the ground. During that time interval, an electric signal is created. The linear velocity of rotation can be obtained if the length of the strip is known simply by dividing this length by the duration of the voltage/current pulse.

Additional information is provided by the frequency at which the pulses occur due to the rotation of the vehicle. Both are related to each other and to the linear velocity of tyre motion. The difference in linear velocity of the tyre calculated from the pulse duration and from the frequency of tyre rotation (which is proportional to the angular speed of tyre rotation from which linear velocity of tyre motion can be calculated assuming certain tyre diameter, for example the diameter the tyre has at an appropriate air pressure) using appropriate software should be constant. When the difference is not constant but varies in time it signals that the skid did take place.

Yet another way to determine whether the skid occurred, or not, is to compare the readings (frequency or the time interval) obtained from the arrangements placed on other wheels to each other. The sensor readings give identical velocities of each of the wheels when the movement with no-skid takes place. When the skid takes place the readings obtained from the skidding wheel(s) will differ from the reading obtained from the non-skidding wheel(s).

In addition, small and slowly varying difference signals that the air pressure is not correct since this changes the tyre diameter and thus the difference in the linear velocity determined by each of the methods, respectively.

Figure 3:
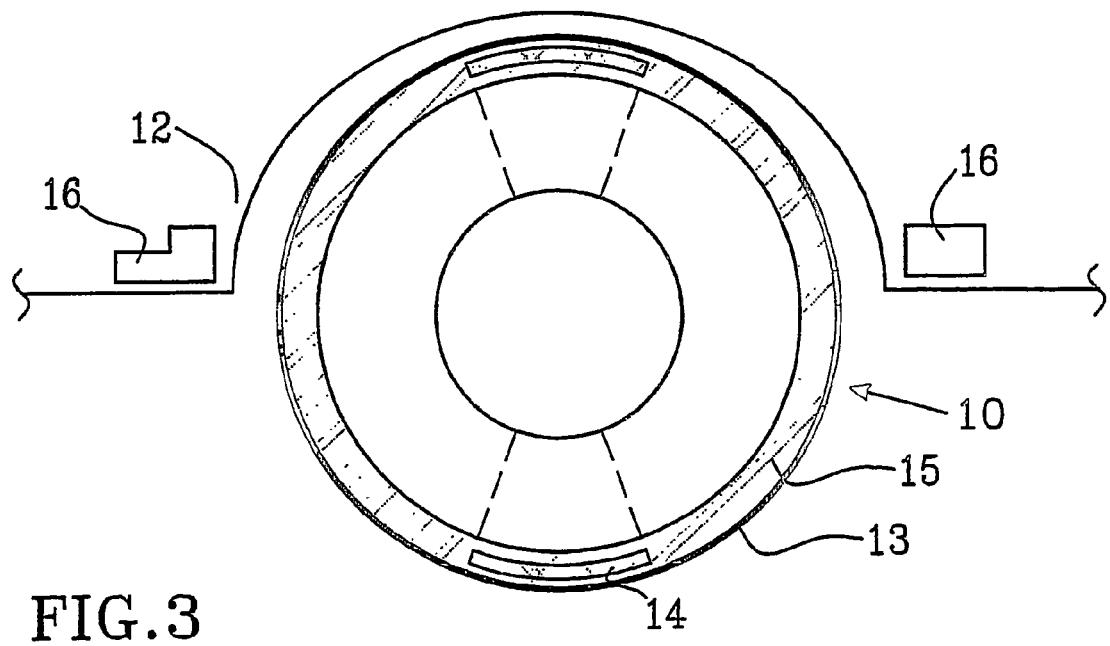
FIG. 3 is a schematic cross-sectional view of a third application employing a device according to the third aspect of the invention.

In the third embodiment of the invention, the sensor 14 is arranged inside the tyre material, see FIG. 3. In this case, the sensor 14 is made of a magnetic material, which is dispersed and disintegrated in the material of the tyre 13, and preferably arranged, in a top layer of the tyre 13. The magnetic sensors 14 are arranged spaced apart (distance 15) inside the material of the tyre 13. As the tyre 13 wears out results are: (1) the amount of the magnetic material decreases, and (2) the distance between the tyre 13 and a preferred detector means, which detector means is to be explained in the following.

In all aforementioned embodiments, one or several detector means 16 for detecting the sensors 111, 112 and 14 (or a signal from the sensors) are arranged and generate a signal. Preferably, the detectors 16 are arranged inside a wheel housing in a conventional vehicle close to the tyre 13. Advantageously, two detectors 16 are arranged on each side of the tyre 13 to be measured, and at a specified distance from each other.

Most preferably, the signal generated by the sensors is transmitted to the detector using capacitive and/or inductive transmission as disclosed in the embodiments of FIGS. 6-14.

The arrangements 10 according the first and the second embodiments of the invention are used for indicating movement. In addition, the atmospheric pressure can also be measured; since the sensor 112 is elongated the tyre 13 is deformed due to air pressure.

Note however that using only a radially placed strip as in FIG. 1a or only a longitudinally placed strip as in FIG. 2 or 3 does not allow one to determine a slow pressure reduction in the tyre during normal use since the piezoelectric materials are not sensitive to slow deformation rates.

In the second embodiment, the velocity is obtained by indicating the time intervals between the sensors 112, contacting the ground and the length of the strip-shaped sensors 112.

Furthermore, for obtaining the spin characteristics of the vehicle wheel, it is also possible to compare the axial frequency of the wheel to the frequency of the ground contact. If these frequencies are different, spinning may occur.

In the third embodiment, the material characteristics, e.g. the amount of the magnetic material in the tyre 13 is indicated. The signal intensity strength declines as the amount of the magnetic material 14 decreases and the distance between the tyre 13 and the detector means 16 increases, whereby the wear can be determined.

Clearly, in above-mentioned examples, the wheel can be substituted with any rotating structure.

In the following, the arrangements 20 and 30 according to additional embodiments of the invention for determining the condition and the characteristics of a material are described in conjugation with schematic FIGS. 4-5b, which relate to application of a sheet material production such as paper. In the embodiments, the condition and the characteristics mainly refer to the presence of material and the movement as well.

The arrangements 20 and 30 comprise at least one substantially cylindrical rotating body, which in the following denoted rolls 23 and 33. Structures 22 and 32 are arranged to cooperate/interact with the rolls 23 and 33. In this case, the structure 22 and 32 can be a wire, belt, paper sheet, banknotes, paper money or the like. Furthermore, the structures 22 and 32 are arranged adjacent to the rolls 23 and 33; however, in some cases the structures 22 and 32 can partially or completely be arranged at least partly in contact with the rolls 23 and 33.

Figure 4A:
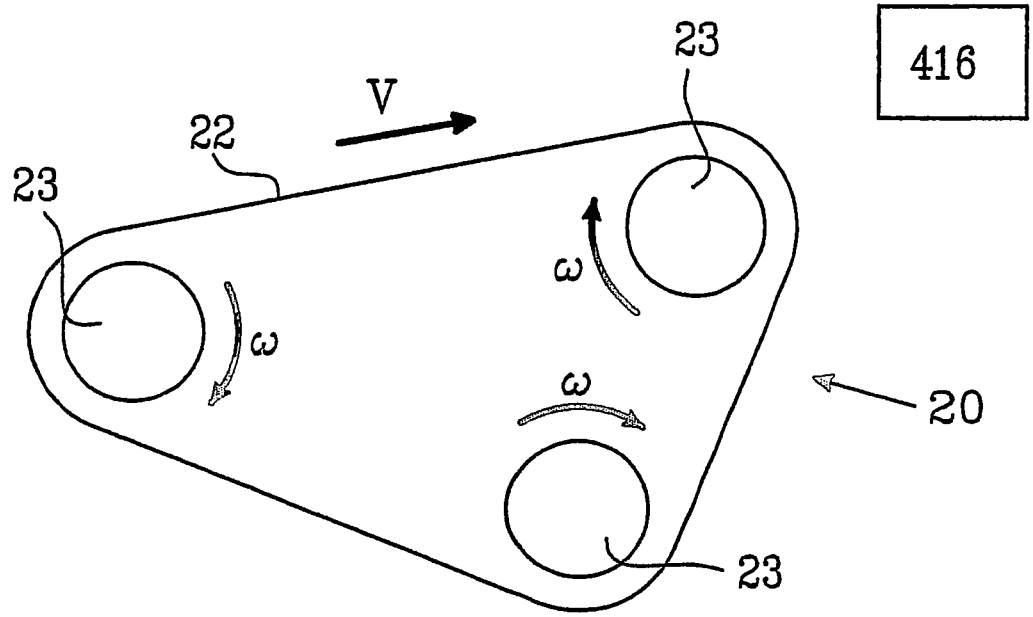
FIG. 4a is a schematic side view of an arrangement comprising a device according to a fourth embodiment of the invention.
Figure 4B:
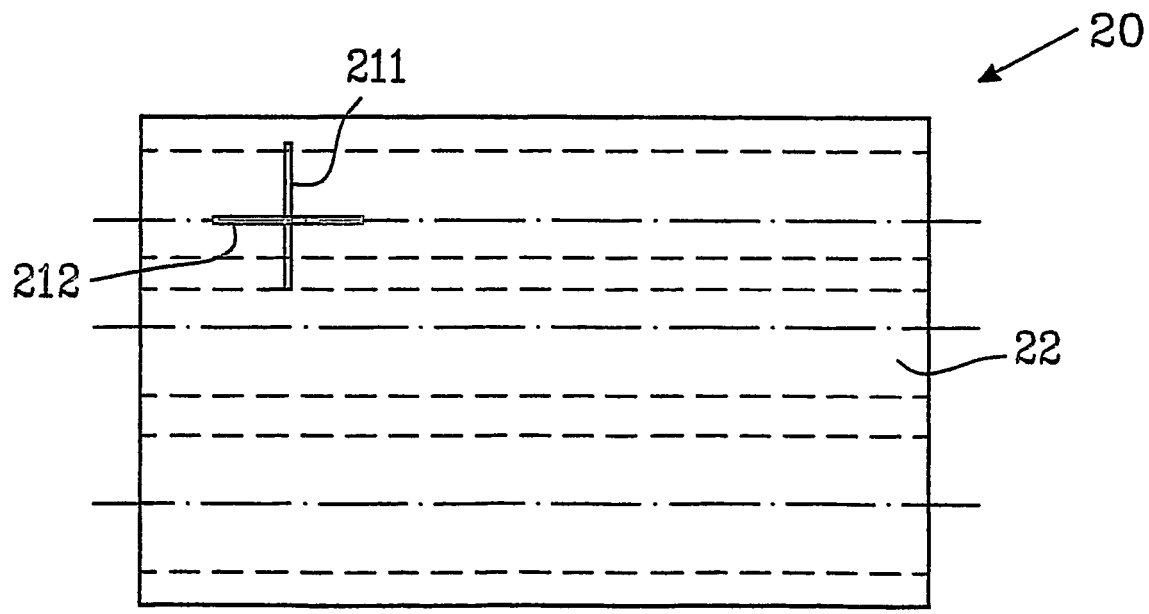
FIG. 4b is frontal view of the arrangement according to FIG. 4a, FIG. 5a is a schematic side view of an arrangement using a device according to a fifth embodiment of the invention.

In FIG. 4a, a belt or a conveyer 22 extends between three rolls 23 in a paper-manufacturing machine, for example. Sensors 211 and 212 are arranged inside the material of the belt 22, as shown in a lateral view in FIG. 4b. In this case, the sensors 211 and 212 are integrated into the belt 22, either in the longitudinal direction of the belt 22, and/or in the transverse direction of it. The sensors 211 and 212 may consist of wires of a piezo-electrical polymeric material or a magneto-elastic material (which may or may not be covered by a suitable polymer).

Moreover, at least one detector 416 can be arranged in connection with the sensors 211 and 212 and the paper-manufacturing machine.

During the operation of the paper-manufacturing machine, the sensors 211 and 211 are subjected to additional compression and elongation as the belt 22 passes the rolls 23. If the sensors 211 are arranged in the transverse direction of the belt 22, the frequency of the obtained pulses is measured when the sensors 211 is subjected to an additional tension. The frequency is proportional to the velocity, and the velocity of the roll 21 can easily be calculated by means of appropriate software. Alternatively, if the sensor 212 is arranged in the longitudinal direction, the absolute linear rotation speed of the rolls 23 is measured in substantially the same way as described above in connection with tyres, and subsequently converted to a frequency, which is then compared to the frequency of the belt 22.

Thus, the speed of the belt 22, which should be constant, can be measured for ensuring that it does not slide on the rolls 23. The speed of the belt 22 can also be measured in relation to the rotation speed of the rolls 23. In this way it is possible to detect if the belt 22 slides on the rolls 23, which in turn indicates that the belt 22 is exhausted, probably due to its elongation, and should be replaced.

In this embodiment, it is also possible to use magnetic particles as an alternative to the piezo-electrical polymeric material. The magnetic particles are woven into the transverse or longitudinal threads in the same way as described above. Consequently, the primary signal is not an electrical pulse but a magnetic field pulse. Magnetic field pulses can be detected by means of, e.g., a hall-sensor or a coil. Furthermore, a pulsed magnetic field results in current pulses in the coil. It is also possible to use a substantially magneto-elastic material in the threads; whereby an elastic deformation of the threads will give rise to a magnetic field change.

Naturally, this embodiment can also be used in other applications involving stretching a material, such as a cloth or a fabric, wherein the movement can be controlled by means of rolls.

Figure 5A:
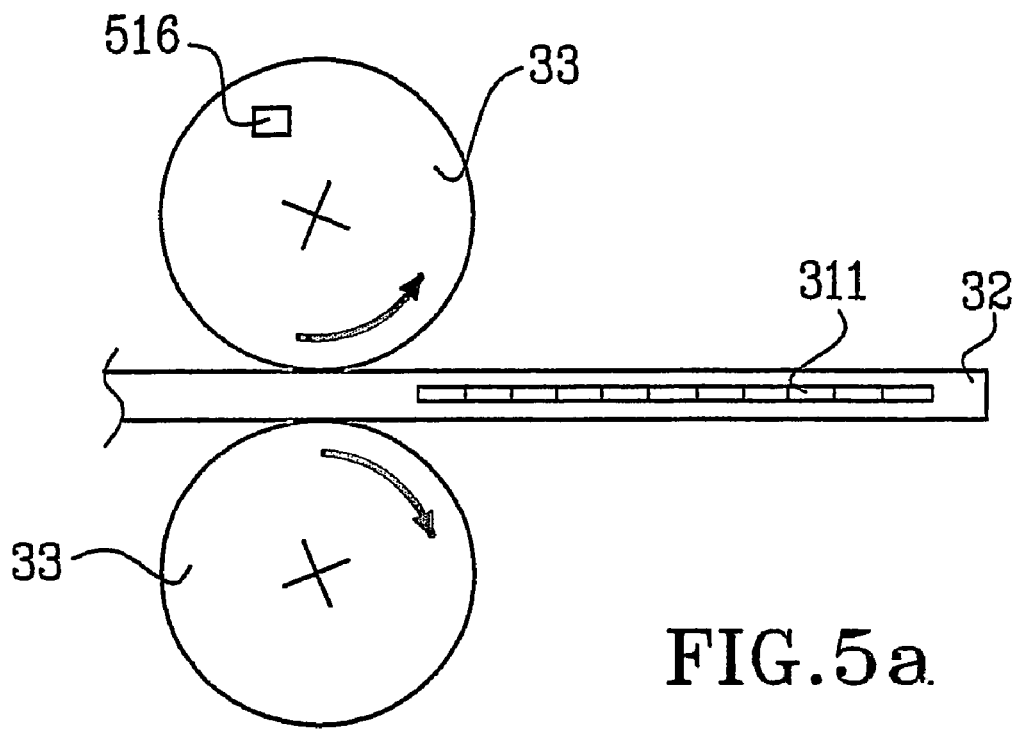
FIG. 5b is a schematic side view of an arrangement according to a sixth embodiment of the invention.

In a fifth embodiment, which is shown in FIG. 5a, two rolls 33 are preferably arranged in a printer application 20 for feeding paper sheets (or other information carrier). At least one sensor 331 is arranged on the surface of the printing paper, or substantially within the printer paper 32. In the preferred embodiment, the sensor 331 comprises a foil integrated substantially inside the paper 32. At least one detector 516 can be arranged to detect the presence of the sensors.

In this case, the movement is indicated in form of, e.g. Interruptions in the printer, which are possible to predict if the velocity of a paper moving through the printer rolls and the velocity of the printer rolls are known.

Figure 5B:
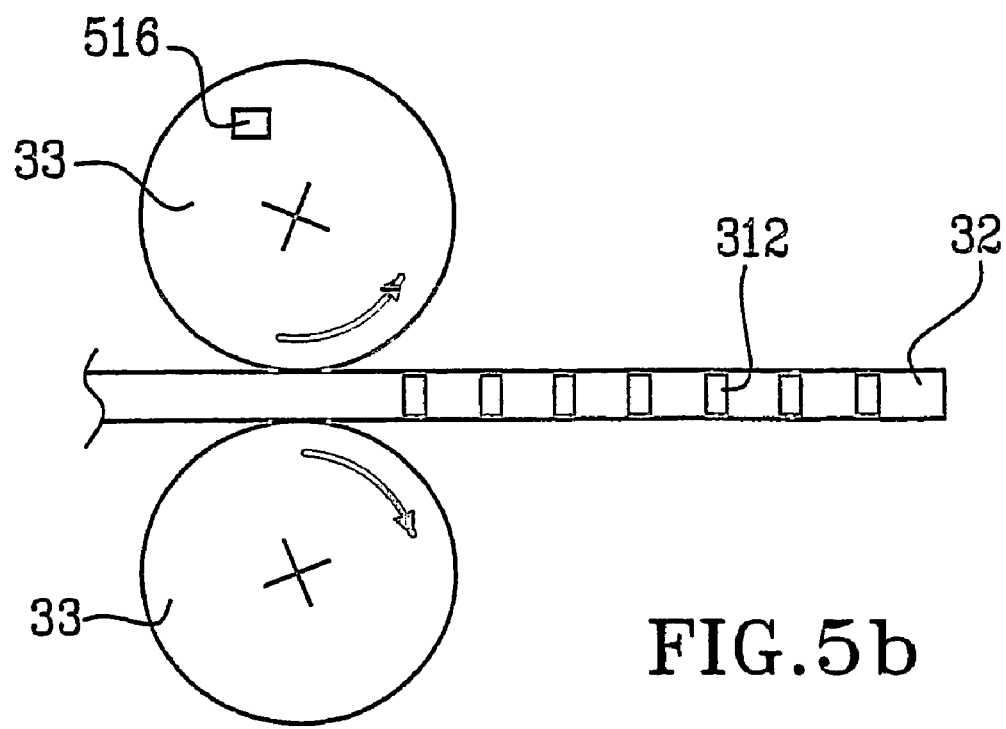

Yet another preferred embodiment in form of a banking paper application for the feeding of bank notes, paper money or the like is shown in FIG. 5b, which is principally designed as the printing application described above. The difference is that at least one sensor 312 is arranged as a strip. Preferably, several sensors 312 constitute a bar code in the banking paper or paper money 32.

In the latter applications, the bank notes and paper money pass between the rolls 33, which read the frequency of the pulses generated because of the sensors. Then, the frequency is determined by means of the distance between the sensors 312 and the speed with which the feeding arrangement, i.e. the rolls 33, feed the banknote(s). If the bank notes or the paper money are forgeries, the sensors may not be present or the distances between the bar codes 312 will vary, which causes change of the frequencies. Thus, in this case a presence (existence/availability) of material in form of sensors 312 is indicated, and not the movement characteristics.

As mentioned, it is also possible to replace the piezoelectrical polymer material with magneto elastic material in all the embodiments mentioned above. Then the sensors should preferably be shaped as thin foils. An elongation or a compression of the foil causes a local variation in magnetization, which fades away when the material retains to its original shape.

Thus, in the first mentioned embodiment, the body 13 can be comprise of complete or parts of tyres arranged, rolls, rollers, cylinders, delivery bowls, rubber-covered cylinders, drums, hole cylinders, etcetera in other applications such as conventional rolls in all types of machines, e.g. paper making machines, printers, banking paper applications for bank notes and paper money including rolls, and arrangements of rubberised materials in general in other embodiments of the invention.

The sensors 111, 112, 14, 211, 212, 311 and 312 can comprise a strip-shaped band, a foil, a thread, a particle or the like. Furthermore, the detector means 16 is preferably constituted of coils, transponders or the like. Finally, it is also possible to put sensors 111, 112, 211, 212, 311 and 312 perpendicular to each other for obtaining an absolute velocity, i.e. independent or the radius of the substantially cylindrical body 13, 23, 33.

The embodiments of FIGS. 5*a* and 5*b* also can realise a nip formed by the rolls 33 and a conveyer shaped structure 32, such as a shoe press, wire, felt or band. Sensors 311 are arranged inside the structure 32 providing a receiver with information about the pressure and pressure distribution in the nip between the rolls. A most preferred application is for example in the nip roll, roller press, Yankee machine, shoe press, smoothing coating machine of a paper-manufacturing machine or any other apparatus for applying a pressure to a structure passing there through.

Most preferably, the sensor can be made of a polymeric piezoelectric material, such as PVDF, polyvinylidenfluoride. The sensors may be shaped as films, cables, threads and filaments etc., depending on the application area.

Figure 6:
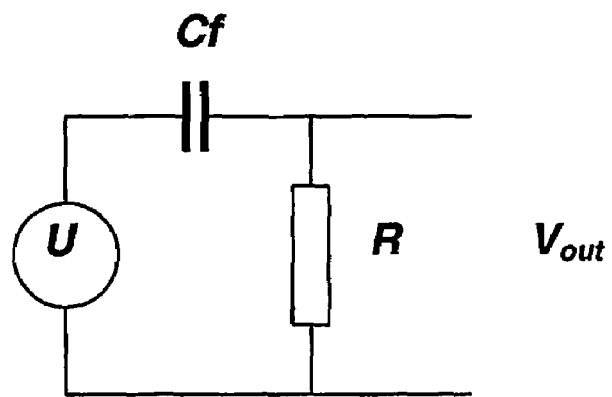
FIGS. 6-8 illustrate equivalence circuit schemes.

The basic idea is that when a piezoelectric material having two electrodes is subjected to a pressure, a potential variation is obtained as an output signal between the electrodes. An equivalent circuit for a piezoelectric polymer sensor is illustrated in FIG. 6, which realises the piezoelectric polymer sensor as a high-pass filter with a characteristic cutoff frequency, $f_0$:

$$f_0 = \frac{1}{2\pi RC_f} \quad (1)$$

When a load is applied to the piezoelectric sensor a charge displacement is obtained in the polymeric piezoelectric material, which gives rise to a voltage U that is directly proportional to the force loading the sensor. The capacitance $C_f$ is the result of the dielectric material between the two electrodes and its value depends on the sensor type (film, wire), its dimensions and the relative dielectric constant of the material used. R is the total resistance comprising the polymer material resistance and input resistance of a measuring unit.

When measuring the output signal $V_{out}$ is measured but U, which provides the force on the sensor, is the interesting value. Having $V_{out}$, U is obtained through:

$$V_{out} + RC_f \frac{dV_{out}}{dt} = RC_f \frac{dU}{dt} \quad (2)$$

$$V_{out} = U \frac{j\omega RC_f}{1 + j\omega RC_f} \quad (3)$$

Figure 7:
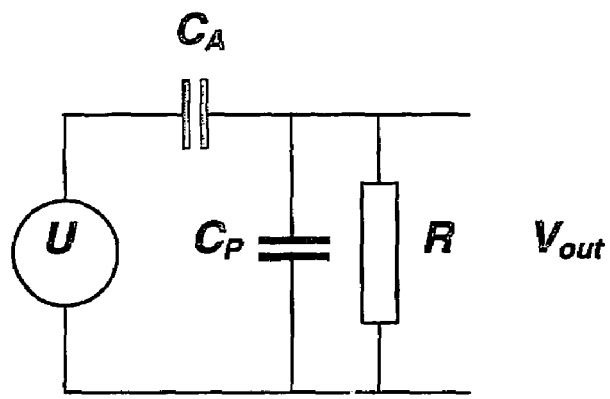
Figure 8:
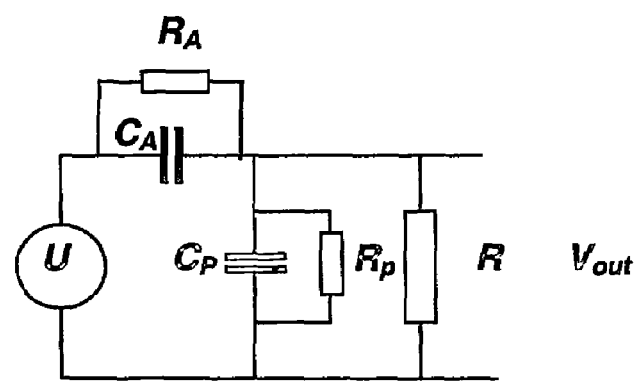

If the entire sensor is not loaded, the polymer capacitance is divided in a capacitance, which corresponds to the loaded area, $C_A$, as illustrated in the circuit diagram of FIG. 7. $C_p$ corresponds to the non-loaded part.

Due to the dielectric losses on the PVDF material, an apparently frequency dependent resistance and capacitance can be obtained, if the sensor is contemplated between the sensor electrodes is contemplated. This effect must be considered to be able to obtain a complete transfer function from the force load of the sensor to the output signal from the sensor system. The frequency dependent of the resistance and capacitance can be realised by inserting resistances $R_A$ and $R_P$ parallel to $C_A$ and $C_P$, as illustrated in the circuit diagram of FIG. 8. Wherein:

$$R_A = \frac{1}{\omega C_{0A} \varepsilon''}, \quad R_P = \frac{1}{\omega C_{0P} \varepsilon''}, \quad C_A = \varepsilon' C_{0A} \text{ and } C_P = \varepsilon' C_{0P}$$

wherein $\epsilon'$ and $\epsilon''$ are the real and the imaginary part of the relative permittivity for the dielectric material (such as PVDF), $C_{0A}$ and $C_{0P}$ are the capacitances of the sensor without dielectric material and $\omega$ is the frequency.

This circuit will block signals at sufficient enough high frequencies, i.e. a band pass filter.

Having integrated the sensors in the conveyer, for example, the signals must be detected and transmitted to a processing unit. According to one preferred embodiment of the invention, it is achieved by contactless communication.

Figure 9:
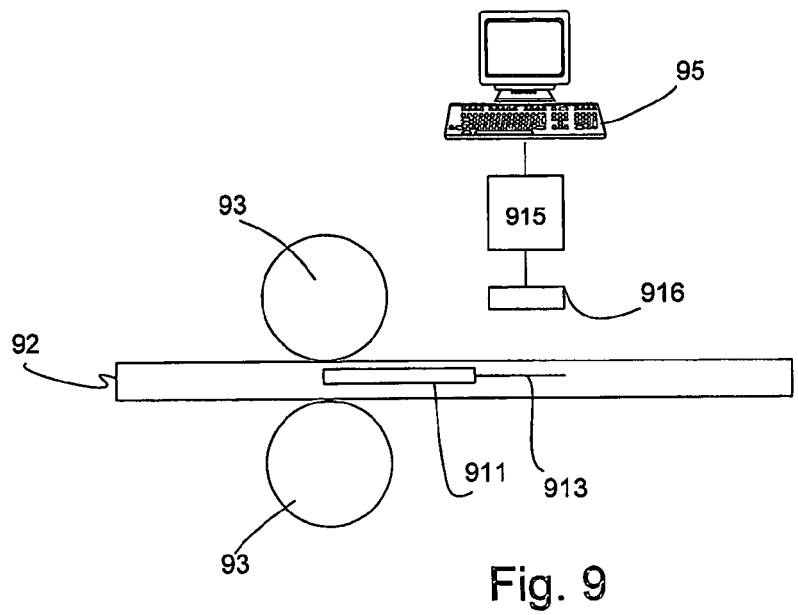
FIG. 9 is a schematic view of seventh embodiment.

FIG. 9 illustrates an embodiment of the invention for detecting $V_{out}$. A conveyer 92 extends between two (nip) rolls 93. The conveyer is incorporated with a number of piezoelectric sensors 911 (only one illustrated for simplicity reason). Two conductors 913 are arranged as antennas connected to the outputs of the piezoelectric sensor. For receiving the transmissions from the antennas 913, a receiver antenna 916 is arranged adjacent to the conveyer. Preferably, the receiver antenna 916 comprises two conductive plates. The conductive plates are then connected to a receiver 915, comprising a differential amplifier and a analogue-digital converter (ADC), in which the received analogue signals from the antennas are converted to a digital signal by sampling with a predetermined rate and transmitted to a signal processing unit, for example in a computer 95. Clearly, the receiver 915 can be integrated in the computer 95. The result of the processed signal corresponds to the force, to which the piezoelectric sensors are subjected.

Figure 10:
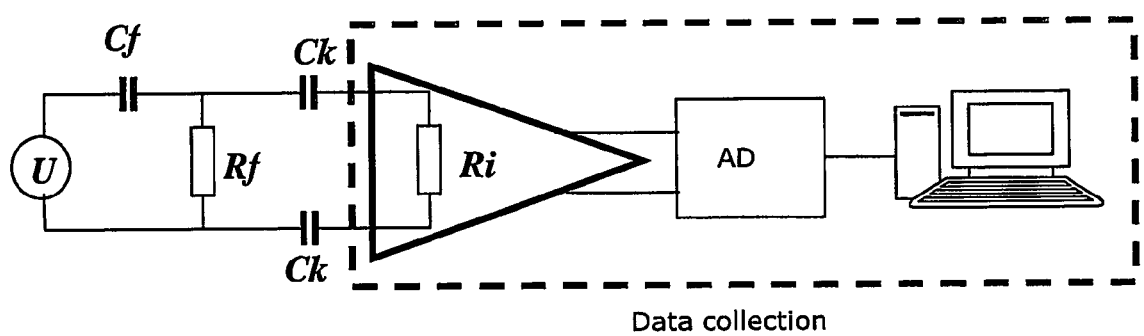
FIG. 10 illustrates an equivalence circuit scheme.

The contactless transmission can be compared to a capacitive coupling, i.e. a coupling capacitance $C_K$ is obtained between the transmitting antenna and the receiver antenna. FIG. 10 illustrates the equivalent circuit diagram for the entire system comprising the piezoelectric sensors, antennas, amplifier and the data collection. $R_I$ is the input resistance of the amplifier, which can be a charge or voltage amplifier. The value of $C_K$ will alter with respect to the relative position of the transmitting and receiving antennas. To compensate for the variation, the transmitter antennas can be made smaller than the receiver antennas, thus tracking the entire nip process. For obtaining a pressure value between the rolls, the signal from the sensor is traced from the moment the piezoelectric sensor is loaded until the sensor passes through the roller's nip. This requires that the extension of the receiver antennas is larger than the transmitter antennas. The transmitter antennas must be made small to allow incorporation into the conveyer material.

Figure 11:
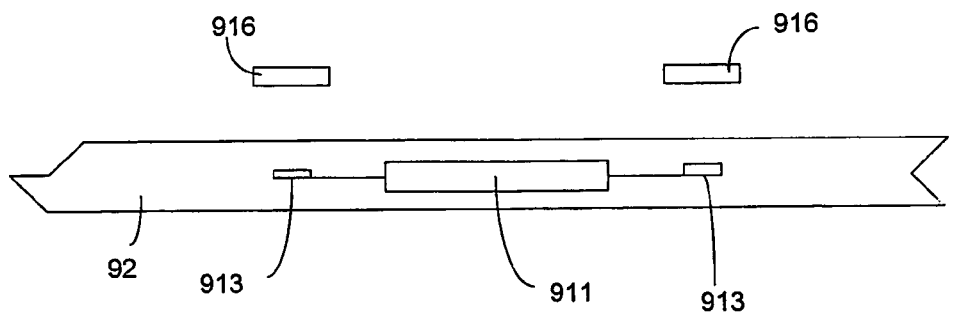
FIG. 11 is a cross-sectional view through a conveyer encapsulating an arrangement according to the invention.

FIG. 11 is a cross sectional view through the conveyer 92 according to FIG. 9, Illustrating the sensors 911, transmitting 913 and receiving antennas 916. The sensor extends into the plane of the drawing. For obtaining a good capacitive coupling between the transmitting and receiving antennas, the transmitting antennas must be spaced apart in such a way that minimum or null electrical field lines are between the transmitting antennas. The aim is that main part of the electrical field lines extends between the transmitter and receiver antennas pairs.

Figure 12:
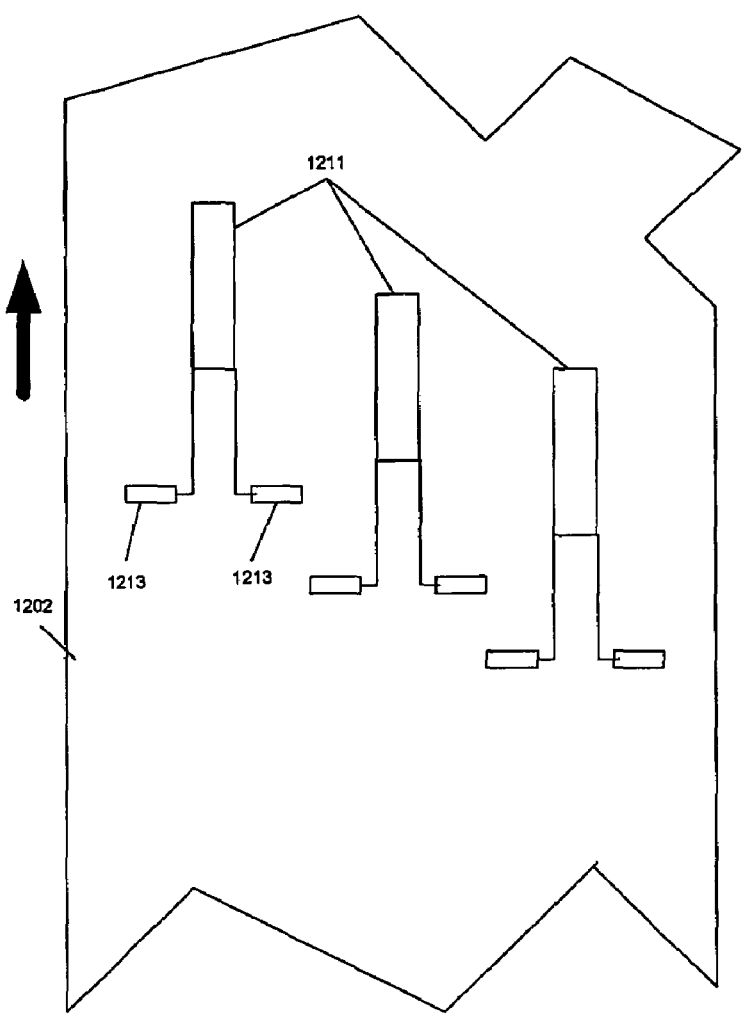
FIG. 12 is a lateral view of a part of a conveyer according to FIG. 11.

The piezoelectric sensors 1211 can be distributed in the conveyer 1202 as illustrated in FIG. 12. 1213 denote the transmitting antennas. The arrow shows the direction of motion of the conveyer. The overlapping arrangement of the sensors allows continues signal acquisition. However, the signal-processing unit must switch between the antennas to obtain relevant information. This embodiment allows measurement of pressure distribution in the width direction of the conveyer.

Having the length of each piezoelectric sensor, or the distances between the different sensors, start and end of each signal generated from each piezoelectric sensor allows computing the actual speed of the conveyer. Thus, it is also possible to detect if the belt or machine clothing has an askew motion, i.e. different speed at different parts.

Preferably, one receiving antenna is used for each transmitting antenna, however, if the signal level is strong enough and if it is possible to distinguish between the signals from different piezoelectric sensors, one antenna extending over the width of the conveyer will be enough.

Vibrations and flexures in the sensors may cause incorrect signal readouts; to reduce or eliminate the problem a differential signal between a loaded sensor, i.e. passing through the nip, and an unloaded sensor can be used. The technique implies that a differential signal between two adjacent sensors is generated. The same differential technique can be used to compensate for temperature variations. In this case two adjacent loaded and unloaded sensors can be used such that they have substantially same temperature. Thus, it is possible to measure temperature variations.

Figure 13:
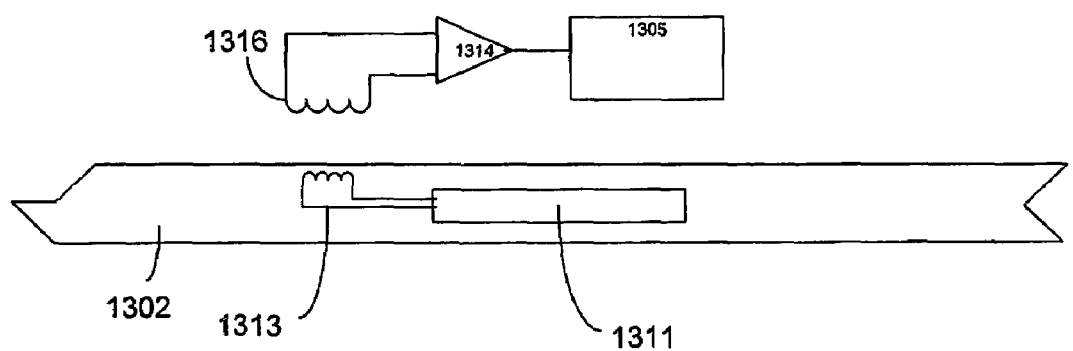
FIG. 13 is a cross-sectional view through a conveyer encapsulating an arrangement according to another aspect of the invention.

The capacitive transmission as described earlier can be substituted by an inductive transmission. In this case, as illustrated in FIG. 13, a coil 1313 is used as the transmitter instead of the antennas. The receiver antenna is substituted with another coil 1316, e.g. having a magnetic core to obtain stronger signal from the transmitter coil 1313. The receiver coil can be connected to an amplifier 1314 and a signal processor 1305, in the same way as described earlier.

Figure 14:
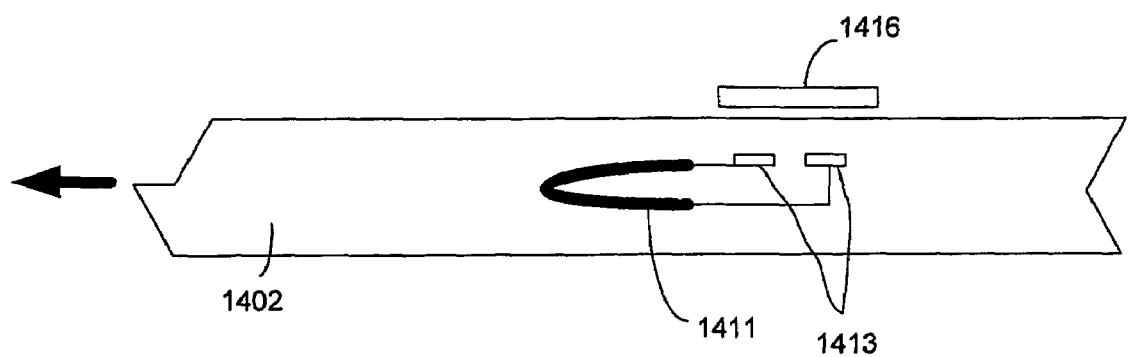
FIG. 14 is a cross sectional side view through a conveyer encapsulating an arrangement according to one embodiment of the invention.

In yet another embodiment, as illustrated in FIG. 14, the piezoelectric sensor 1411 arranged inside the conveyer 1402 may be folded such that the piezoelectric sensor operates in a bending mod, which provides better signal level than thickness mod. The antennas 1413 connected at the ends of the sensor are thus arranged on one side of the sensor and in same level with respect to the receiver antenna 1416. The arrow indicates the motion direction of the conveyer.

The above-described embodiments are not limited to piezoelectric sensors but magneto-elastic material may also be used. In this case the sensor and the antenna may be the same, and an inductive detection is used.

In yet another embodiment a magnetic material acting as a core in an inductor can be incorporated in the conveyer while the receiver is arranged as a coil for recovering inductance changes.

In a paper manufacturing machine, for example, the resulting signals from the sensors are used to control the distance between the rolls and thus the pressure or nip pressure of the rolls, e.g. In real time by means of the computer.

Moreover, it is appreciated that the term "conveyer" considers any type of a carrying arrangement for different types of material and in any application not being depending on the material it is made of. It may also consider the material itself passing through the rolls.

The invention is not limited to the shown embodiments but can be varied in a number of ways, e.g. through combination of two or more embodiments shown, without departing from the scope of the appended claims and the arrangement and the method can be implemented in various ways depending on application, functional units, needs and requirements, etc.

The invention claimed is:

1. A system for detecting at least one physical characteristic of an elastic structure subjected to a force under a motion, said structure being provided with at least one sensor comprising a first and a second electrodes and a piezoelectric material, which upon deformation generates a charge displacement in the material giving rise to a voltage between said first and second electrodes being directly proportional to the force causing the deformation, said voltage being convertible to a signal representing said characteristic, and said system comprising at least one detector comprising a receiver for receiving said signal representing said characteristic, wherein said sensor further comprises a first sensor conductor being connected to said first electrode and a second sensor conductor being connected to said second electrode, said first and said second sensor conductors being arranged as antennas, and wherein said detector comprises a receiver antenna arranged adjacent to said elastic structure for capacitively sensing said voltage between said first and said second sensor conductors, thereby enabling determination of said characteristic.

2. The system of claim 1, wherein said structure is a flat structure.

3. The system according to claim 1, wherein said structure is a belt, a conveyer, a wire, a sheet material, a paper sheet, a fabric, a cloth, a printing paper, paper money, or bank notes, and said structure cooperates/interacts with at least one substantially cylindrical rotating body.

4. The system according to claim 3, wherein said at least one substantially cylindrical rotating body is a roll.

5. The system according to claim 4, wherein said structure cooperates/interacts with two rolls.

6. The system according to claim 4, wherein said structure cooperates/interacts with three rolls.

7. The system according to claim 4, wherein the roll(s) is/are arranged in a paper-manufacturing machine, said structure is a belt or a conveyer, and sensors are arranged inside the material of the belt, either in the longitudinal and/or transverse direction of the belt.

8. The system according to claim 4, wherein the roll(s) is/are arranged in a printer application, said structure is a printing paper, and at least one sensor is arranged on the surface of the printing paper or substantially within the printing paper.

9. The system according to claim 8, wherein the sensor comprises a foil integrated substantially inside the paper.

10. The system according to claim 4, wherein the rolls are arranged in a banking paper application, said structure is bank notes or paper money, and the sensor is arranged as a strip on the surface of the bank note/paper money or substantially within the bank note/paper money.

11. The system of claim 1, wherein said structure is a substantially cylindrical rotating structure.

12. The system according to claim 11, wherein the sensor deforms during a time period, whereby a part of the structure that contains the sensor is in contact with a surface, whereby during said time period, an electric signal or voltage/current pulse is created, and a linear velocity of rotation is obtained if the length of the sensor is known by dividing this length by the duration of the voltage/current pulse.

13. The system of claim 12, wherein additional information is provided by a frequency at which pulses occur due to the rotation of the structure, both related to each other and to a linear velocity of the structure motion, and a difference in linear velocity of the structure calculated from the pulse duration and from the frequency of structure rotation varying in time indicates skid.

14. The system according to claim 1, wherein the structure comprises a tyre.

15. The system according to claim 1, wherein the structure comprises a roll, a roller, a cylinder, a delivery bowl, rubber-covered cylinder, drum, or a hole cylinder.

16. The system according to claim 1, wherein the structure is a roll or a cylinder feeding a sheet material.

17. The system of claim 1, wherein said sensor, including the transmitter, is arranged on or inside said structure.

18. The system of claim 1, wherein said structure comprises an oblong structure passing through a pressing arrangement.

19. The system according to claim 1, wherein said structure is a conveyer shaped structure in a nip formed by rolls, and at least one sensor is arranged on the surface of the conveyer shaped structure or substantially within the conveyer shaped structure for detecting the pressure and pressure distribution in the nip between the rolls.

20. The system according to claim 19, wherein the nip is present in a nip roll, a roller press, an Yankee machine, a shoe press, or a smoothing coating machine of a paper-manufacturing machine.

21. The system according to claim 20, wherein the characteristic(s) detected is/are the nip force, nip pressure/pressure distribution and/or nip width of the rolls in a nip roll press.

22. The system of claim 1, wherein the sensor is arranged in one of or several of a longitudinal, radial or transversal direction of the structure.

23. The system of claim 1, wherein the sensor is arranged to provide one or several of absolute linear velocity or skid characteristic of the structure.

24. The system of claim 1, wherein one or several sensors constitute(s) a bar code in the structure.

25. The system as claimed in claim 1, wherein the sensor is formed as a cable, a filament, a strip, a foil, a thread, a film, a particle or the like.

26. The system according to claim 1, wherein the receiver antenna comprises two conductive plates.

27. The system according to claim 1, wherein the receiver comprises a differential amplifier, an analogue-digital converter, and a signal-processing unit.

28. The system according to claim 1, wherein several sensors are placed in an overlapping arrangement in the structure allowing continuous signal acquisition and measurement of pressure distribution in the width direction of the structure.

29. The system according to claim 1, wherein the sensor comprises two conductors extending from the ends of the sensor, and the sensor being folded providing two shanks, one of which can be subjected to a force, such that the sensor operates in bending mode.

30. The system according to claim 1, wherein the first and second sensor conductors are spaced apart in such a way that minimum or null electric field lines are between the first and second sensor conductors, and the main part of the electric field lines are between each pair of sensor conductor and receiver antenna.

31. The system according to claim 1, wherein an extension of the receiver antennas is larger than an extension of the first and second sensor conductors.

32. The system according to claim 1, wherein one receiver antenna is used for each sensor conductor.

33. The system according to claim 1, wherein the piezoelectric material is polyvinylidenfluoride (PVDF).

34. The system according to claim 1, wherein a differential signal between a sensor subjected to said force and a sensor not being subjected to said force is used.

35. The system according to claim 34, wherein the differential signal technique is used to measure temperature variations.

36. Use of a system according to claim 1 in an apparatus comprising at least one substantially cylindrical rotating body feeding a sheet material for detecting at least one physical characteristic of said sheet material.

37. The use according to claim 36, wherein the movement, presence of material, rotation speed, and/or sliding characteristics is/are detected.

38. The use according to claim 36, wherein said sensor is used in a paper-manufacturing machine for detecting a characteristic of a belt or a conveyer cooperating/interacting with at least one substantially cylindrical rotating body feeding said belt, said sensor(s) being integrated into the belt/conveyer, either in the longitudinal and/or transverse direction of the belt.

39. The use according to claim 36, wherein said sheet material is a conveyer shaped structure in a nip formed by rolls, said sensor being arranged on the surface of the conveyer shaped structure or substantially within the conveyer shaped structure for detecting the pressure and pressure distribution in the nip between the rolls.

40. The use according to claim 39, wherein the nip is present in a nip roll, a roller press, an Yankee machine, a shoe press, or a smoothing coating machine of a paper-manufacturing machine.

41. The use according to claim 40, wherein the characteristic(s) detected is/are the nip force, nip pressure and/or nip width of the rolls in a nip roll press.

42. The use according to claim 36, wherein said sensor is used in a printer application for detecting a characteristic of a printing paper cooperating/interacting with at least one substantially cylindrical rotating body feeding said printing paper, said sensor(s) being arranged on the surface of the printing paper or substantially within the printer paper.

43. The use according to claim 36, wherein the sensor is used in a banking paper application for detecting a characteristic of bank notes or paper money cooperating/interacting with at least one substantially cylindrical rotating body feeding said bank notes/paper money, said sensor(s) being arranged on the surface of the bank notes/paper money or substantially within the bank notes/paper money.

44. A method of detecting at least one physical characteristic of an elastic structure subjected to a force under a motion using the system according to claim 1, the method comprising:
providing said structure with at least one sensor comprising a first and a second electrodes and a piezoelectric material, which upon deformation generates a charge displacement in the material giving rise to a voltage between said first and second electrodes being directly proportional to the force causing the deformation, said voltage being convertible to a signal representing said characteristic, wherein said sensor further comprises a first sensor conductor being connected to said first electrode and a second sensor conductor being connected to said second electrode, said first and second sensor conductors being arranged as antennas;
providing at least one detector comprising a receiver antenna, in such a way that said receiver antenna is arranged adjacent to said elastic structure; and
capacitively sensing a voltage between said first and second sensor conductors by means of said receiver antenna, thereby enabling determination of said characteristic.

45. A sensor arrangement for incorporation into an elastic structure and for providing at least one physical characteristic of said structure when subjected to a force under a motion, said sensor comprising a first and a second electrodes and a piezoelectric material, which upon deformation generates a charge displacement in the material giving rise to a voltage between said first and second electrodes being directly proportional to the force causing the deformation, said voltage being convertible to a signal representing said characteristic, wherein said sensor further comprises a first sensor conductor being connected to said first electrode and a second sensor conductor being connected to said second electrode, said first and second sensor conductors being arranged as antennas in such a way that capacitive sensing of said voltage between said first and said second sensor conductors is enabled when said sensor is incorporated in the elastic structure.

46. The sensor arrangement according to claim 45, wherein the sensor is formed as a cable, a filament, a strip, a foil, a thread, a film, a particle or the like.

47. The sensor arrangement according to claim 45, wherein said first and second sensor conductors are spaced apart in such a way that minimum or null electric field lines are between the transmitting antennas.

48. The sensor arrangement according claim 45, wherein the piezoelectric material is polyvinylidenfluoride (PVDF).

49. A belt having a sensor arrangement according to claim 45 embedded therein, thereby enabling detection of a force acting on said belt.

* * * * *